United States Patent

[11] 3,588,343

[72] Inventors Frans Brouwer
Glencoe;
Frank L. Sobchak, Chicago, Ill.

[21] Appl. No. 790,071
[22] Filed Jan. 9, 1969
[45] Patented June 28, 1971
[73] Assignee Stewart-Warner Corporation
Chicago, Ill.

[54] FACSIMILE OPTICAL SCANNER ASSEMBLY
1 Claim, 9 Drawing Figs.

[52] U.S. Cl. .......... 178/7.6, 346/139
[51] Int. Cl. .......... H04n 1/24
[50] Field of Search .......... 178/7.6; 346/139 (A), (Inquired), 139

[56] References Cited
UNITED STATES PATENTS

| | | | |
|---|---|---|---|
| 2,770,517 | 11/1956 | Zabriskie | 346/139XA |
| 2,792,448 | 5/1957 | Deuth et al. | 178/7.6 |
| 2,879,129 | 3/1959 | Alden | 346/139A |
| 2,978,288 | 4/1961 | Zabriskie et al. | 346/139A |
| 3,266,047 | 8/1966 | Zabriskie | 346/139A |
| 3,302,210 | 1/1967 | Welsh et al. | 346/17 |
| 3,108,845 | 10/1963 | Zabriskie | 346/139A |

*Primary Examiner*—Robert L. Richardson
*Assistant Examiner*—Richard K. Eckert, Jr.
*Attorneys*—Augustus G. Douvas, William J. Newman and Norton Lesser

ABSTRACT: A timing belt assembly comprised of an endless flexible belt of elastomeric material adapted to be trained about drive and idler pulley assemblies for supporting optical scanner units and moving the same in a continuous closed path upon rotation of the drive pulley assembly.

Inventors:-
Frans Brouwer,
Frank L. Sobchak,
By
Attys

FACSIMILE OPTICAL SCANNER ASSEMBLY

BACKGROUND OF THE INVENTION

1. Field of the Invention

The present invention pertains generally to facsimile apparatus for use in wire transmission of graphic data, and more particularly to improved timing belt assemblies for use in the optical scanner assemblies of such apparatus.

2. Description of the Prior Art

In a typical optical facsimile system, elemental areas of copy material are successively scanned in a transmitter, and images from the scanned material are converted by an optical system into electrical signals for transmission to a receiver. At the receiver, electrical signals from the transmitter are converted to printing current and passed through associated printer contact means and a linear printer bar to produce on intervening moist electrolytic recording paper an image of the transmitted copy. One type of facsimile apparatus adapted for use as a transmitter or receiver is disclosed and claimed in the copending application of Frans Brouwer and Frank L. Sobchak, Ser. No. 613,545, now U.S. Pat. No. 3,527,882 filed Feb. 2, 1967. This apparatus embodies an optical scanner assembly comprised of drive and idler pulley assemblies, a timing belt assembly trained about the pulley assemblies, and combined optical scanner and printer contact units, each including an optical scanner and printer contact means, mounted on the timing belt assembly for movement therewith in a continuous closed path. In the transmission mode of operation, the optical scanners are moved successively across copy material to be scanned, while in the receiving mode, the printer contact means are moved successively across recording paper lengthwise of the printer bar. In the aforesaid optical scanner assembly, the timing belt assembly is comprised of a pair of spaced apart endless flexible tapes of narrow width and a plurality of pin members extending between and secured at their end portions to the tapes, and each combined optical scanner and printer contact unit is mounted on two adjacent pin members of the timing belt assembly. A timing belt assembly of this nature is not as inexpensive to fabricate and assemble as might be desired for certain applications, and can be subject to eventual fatigue about the pin members if improperly suspended. Moreover, as the optical scanner units move about the pulleys, friction may occur which could adversely affect resolution of copy and which could cause undesirable wear of the scanner units and pin members.

SUMMARY OF THE INVENTION

The present invention is concerned with improved timing belt assemblies for facsimile apparatus of the general type described above. This invention contemplates the provision of a timing belt assembly comprised of an endless flexible belt of elastomeric material whereby the use of pin members is eliminated. As a consequence, fabrication and assembly costs of the timing belt assembly are reduced, longer belt life is attained, and improved resolution of copy is achieved. In a modification, a pair of endless flexible metal bands are secured in the edges of the elastomeric belt and are engaged about the drive and idler assemblies for stabilizing the shape of the timing belt assembly. Also, each optical scanner unit is secured to the timing belt assembly exclusively along a narrow zone extending transversely of the latter whereby to obviate wear of the scanner unit and timing belt assembly components during operation of the optical scanner assembly.

DESCRIPTION OF THE PREFERRED EMBODIMENTS

Figure 1:
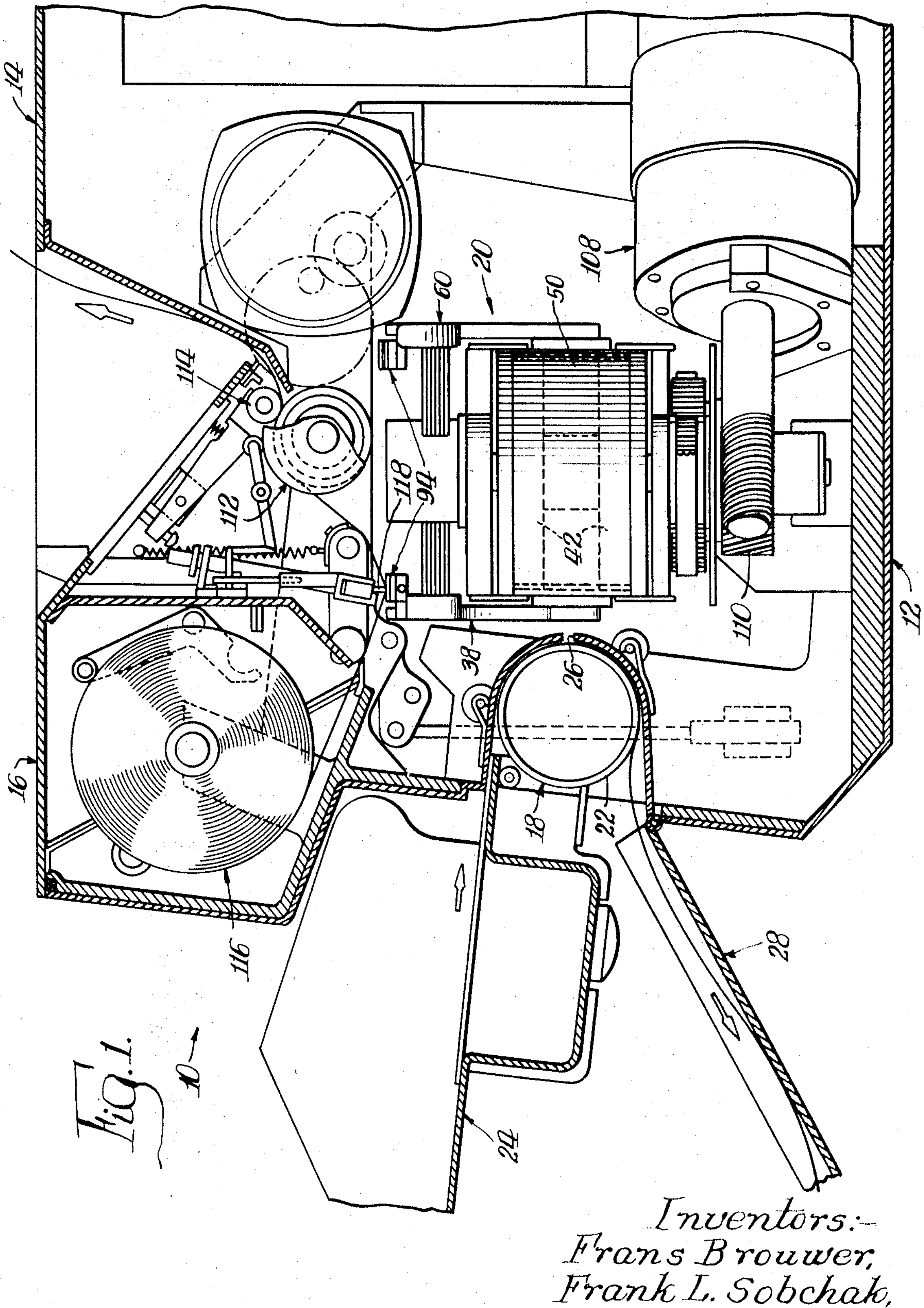
FIG. 1 is a view, partly in section and partly in elevation, of the front portion of a facsimile transceiver incorporating the principles of the present invention.

Referring now to FIG. 1, there is indicated generally by the reference numeral 10 one type of facsimile apparatus–a facsimile transceiver–in which the timing belt assembly of the present invention may be incorporated. The facsimile transceiver 10 comprises a main frame 12 enclosed by a cover assembly 14 and a top door assembly 16.

Figure 2:
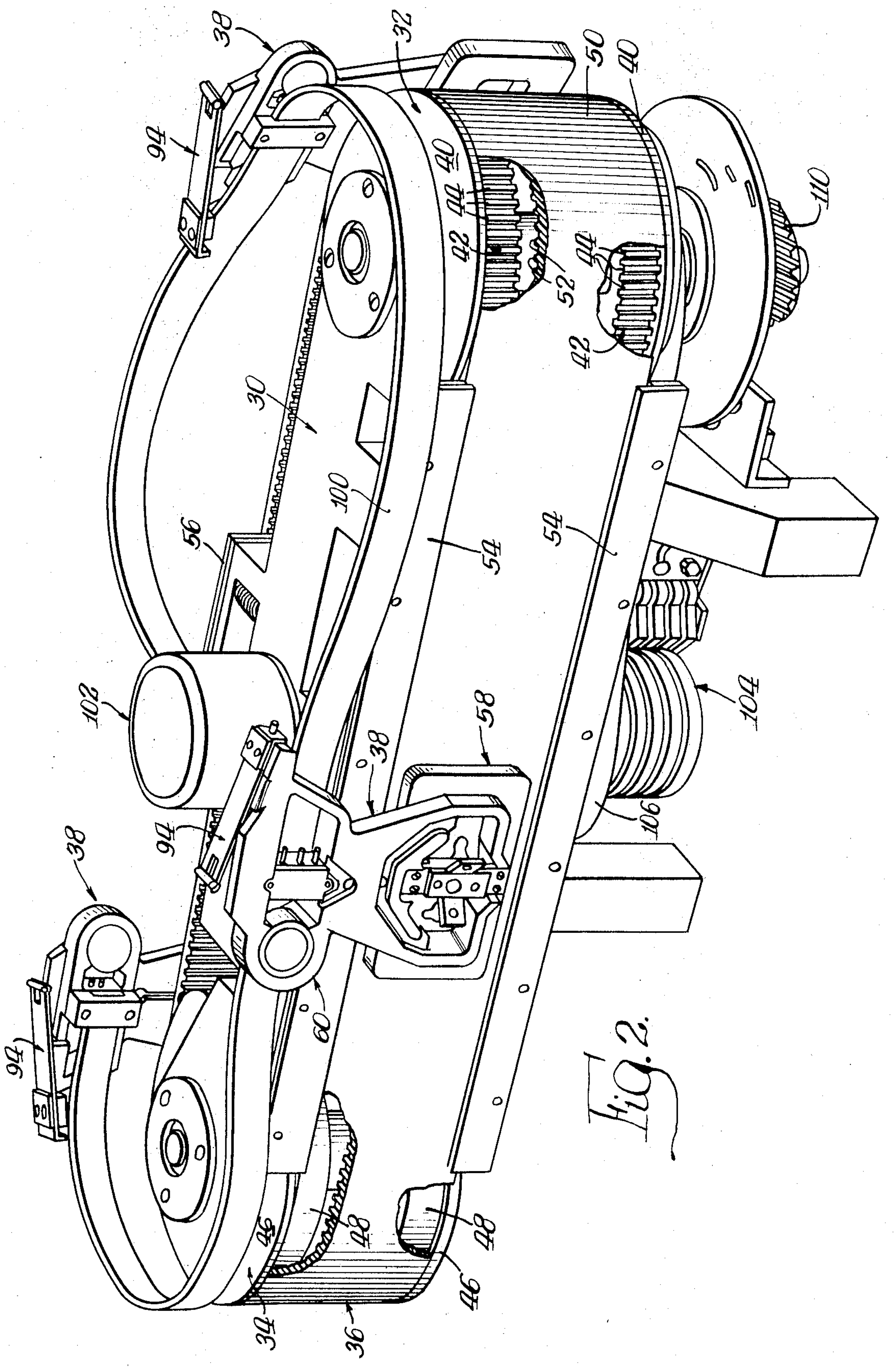
FIG. 2 is a perspective view, on an enlarged scale, looking toward the front of the optical scanner assembly of the facsimile transceiver of FIG. 1.

Operable in the transmission mode of the facsimile transceiver 10 are a copy feed mechanism indicated generally at 18 and a scanner assembly indicated generally at 20. The copy feed mechanism includes a transverse power driven copy feed roller 22 which draws copy material from a copy feed tray 24, feeds the copy material past a longitudinal scanning slot 26, and discharges the same onto a tray 28. The scanner assembly 20 extends parallel to the copy feed roller 22, and, as shown in FIG. 2, includes means 30, drive and idler pulley assemblies 32 and 34, a timing belt assembly 36 embodying the principles of the present invention and trained about the pulley assemblies 32 and 34, combined optical scanner and printer contact units 38 carried by the timing belt assembly 36, and associated synchronizing and electrical transmission means.

The drive pulley assembly 32, which is rotatably mounted about a vertical axis in the frame 30 at one end thereof, comprises a pair of axially spaced flanges 40, and a pair of axially spaced gear sections 42 having circumferentially spaced exterior teeth 44. The idler pulley assembly 34, which is rotatably mounted about a vertical axis in the frame 30 at the other end thereof, comprises a pair of axially spaced flanges 46, and a pair of axially spaced cylindrical bearing sections 48. To maintain proper guidance of the timing belt assembly, the idler pulley flanges 46 lie in the same planes as the corresponding flanges 40 of the drive pulley assembly 32, and the cylindrical bearing sections 48 of the idler pulley assembly 34 are of the same diameter as the minor diameter of the gear sections 42 of the drive pulley assembly 32.

Trained about the drive and idler pulley assemblies 32 and 34, as previously noted, is the timing belt assembly 36, which is comprised of an endless flexible belt 50 of an elastomeric material such as rubber or urethane reinforced with dacron or woven glass. The elastomeric belt 50 is provided with circumferentially spaced interior teeth 52. When the timing belt assembly 36 is mounted about the drive and idler pulley assemblies 32 and 34, the belt 50 is engageable about the bearing sections 48 of the idler pulley assembly 34, while the belt teeth 52 have meshing engagement with the teeth 44 of the drive pulley assembly 32. Thus a positive driving connection is established between the drive pulley assembly 32 and the timing belt assembly 36. Also, the edges of the timing belt 50 are engageable with the inner radial faces of the drive pulley flanges 40 and the idler pulley flanges 46 whereby the timing belt 50 is maintained in vertical alignment. Additionally, pairs of tape guides, in the form of longitudinal flat strips 54 and 56, are provided on the opposite sides of the frame 30 intermediate of the drive and idler pulley assemblies 32 and 34. The tape guides 54 and 56 overlie and engage portions of the outer edges of the belt 50 for maintaining the belt flat against adjacent guide strips or surfaces provided on the frame 30.

Supported by and moved with the timing belt assembly 36 are the combined scanner and printer contact units 38, three of which are incorporated in the specific scanner assembly herein disclosed. Each scanner and printer contact unit 38, as shown in FIGS. 3—6, includes a lower optical scanner assembly 58 and an upwardly extending carriage and contact assembly 60. The scanner carriage assembly 58 comprises a scanner carriage 62 which carries an optical scanner 64. The scanner carriage 62 is provided with a central transverse irregular opening 66, and with four rearwardly extending, internally threaded, locating sleeves 68. The four sleeves 68 are arranged in two vertically spaced pairs, and the two sleeves 68 of each pair are disposed close together. Secured to the front of the carriage 62, by means of screws 70 threaded into the locating sleeves 68, are the lateral flange portions 72 of a horizontal rearwardly extending elongated hollow lens holder 74 which comprises part of the optical scanner 64 and which has mounted therein suitable lens and diaphragm means. Secured to the front end of the lens holder 74 is a lamp holder 76 supporting lamp bulbs 78 which serve as a scanning light source means. Secured to the rear annular flange 80 of the lens holder 74 is a photocell holder 82.

Figures 3, 4, 5, 6, 7, 8, 9:
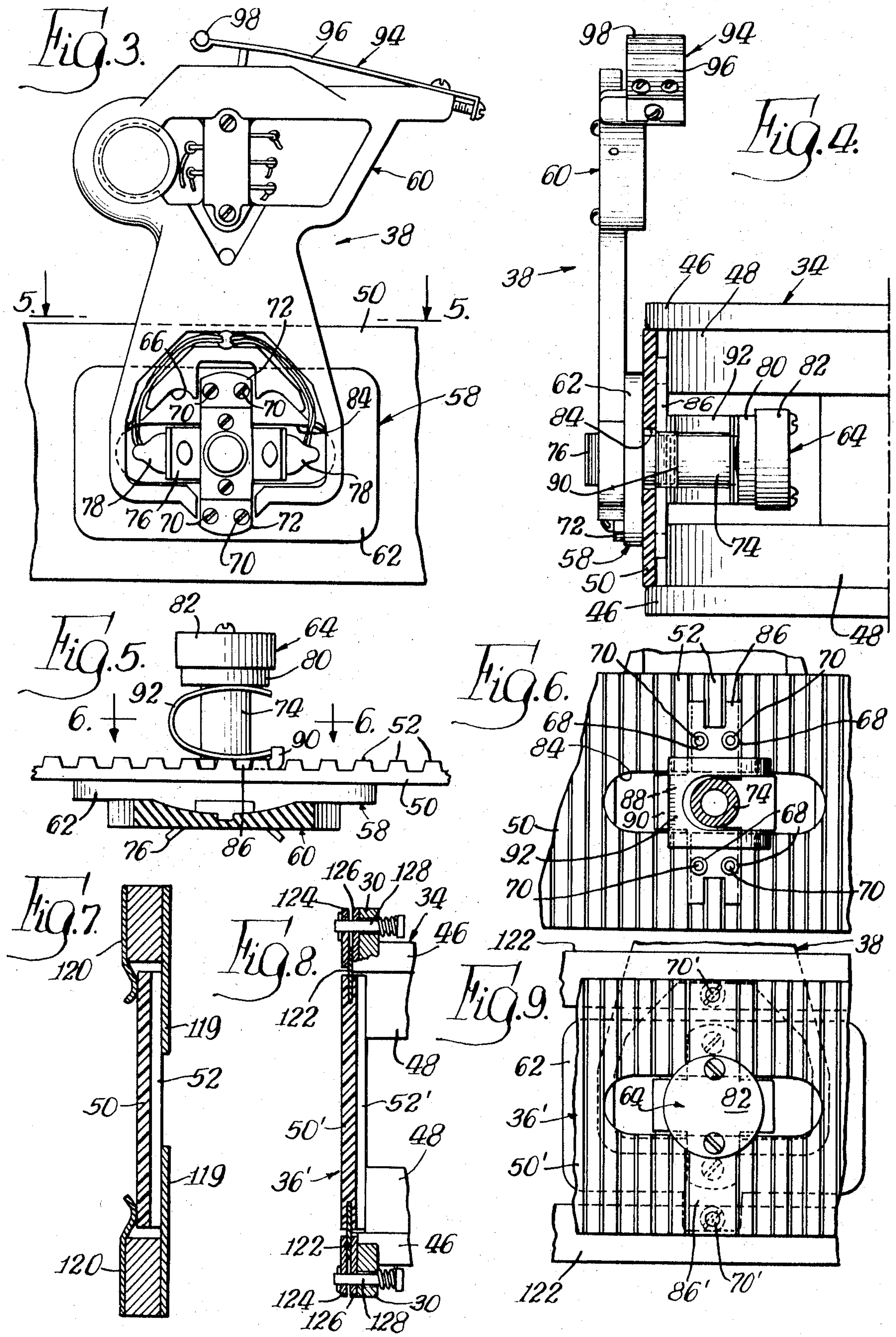
FIG. 3 is a front elevational view, on a further enlarged scale, of one of the combined optical scanner and printer contact units of the scanner assembly of FIG. 2.
FIG. 4 is a side elevational view, with certain portions being removed, of the combined scanner and printer contact unit of FIG. 3.
FIG. 5 is a sectional view, taken substantially along the line 5–5 of FIG. 3, looking in the direction indicated by the arrows.
FIG. 6 is a sectional view, taken substantially along the line 6–6 of FIG. 5, looking in the direction indicated by the arrows.
FIG. 7 is a vertical sectional view of modified guide means associated with the timing belt assembly of FIG. 2.
FIG. 8 is a vertical sectional view of a modified embodiment of timing belt assembly.
FIG. 9 is a fragmentary elevational view of an optical scanner unit mounted in the modified embodiment of timing belt assembly shown in FIG. 8.

In mounting each scanner and printer contact unit 38 on the timing belt assembly 36, the lens holder 74 is disposed through an elongated slot 84 formed in the belt 50, and the locating sleeves 68 are disposed through apertures provided in the belt 50. A clamp plate 86 having a laterally offset midsection 88 with a rearwardly extending flange portion 90 is positioned about the lens holder 74 and is suitably apertured to receive the locating sleeves 68. To accommodate the clamp plate 86, portions of the teeth 52 of the belt 50 are cut away as shown in FIG. 6. To secure the scanner carriage 62 to the timing belt assembly 36, a generally U-shaped centrally slotted leaf spring 92 is disposed about the lens holder 74 with one end abutting the lens holder flange 80 and the other end abutting the clamp plate 86. The end edge of the leaf spring 92 at the clamp plate 86 is engaged behind the clamp flanged 90 to releasably maintain the leaf spring 92 in securing position. In the foregoing manner, the combined scanner and printer contact unit 38 is secured to the timing belt assembly 36 essentially at the four points of the locating sleeves 68 exclusively along a narrow zone extending transversely of the assembly 36. This four-point suspension accommodates relative movement between the opposed sides of the carriage 62 and the belt 50, and obviates wear of these components, as they pass around the drive and idler pulley assemblies.

Mounted at the upper end of the carriage and contact assembly 60 is a printer contact assembly 94 comprised of an elongated strip or leaf spring member 96 and a contact element 98 in the form of a cylindrical pin member. As shown in FIG. 2, the combined scanner and printer contact units 38 are adapted to be connected to other electrical components of the transceiver 10 by means of a ribbon tape 100 and a rotor assembly 102. The rotor assembly 102 includes a commutator assembly 104 and is adapted to be driven from the drive pulley assembly 32 by means of a belt 106. A motor 108 (FIG. 1) is arranged to drive a gear 110 at the lower end of the drive pulley assembly 32.

When the gear 110 is rotated, the drive pulley assembly 32 and the timing belt assembly 36 are correspondingly rotated, and the optical scanner carriage assemblies 58 are accordingly moved in a continuous closed path, a portion of which extends parallel to the copy feed roller 22. As copy material is drawn about the copy feed roller 22, it is scanned, line-by-line, an elemental area at a time. The images received by the optical scanners 64 from the copy material are converted to electrical signals through suitable circuitry, and these signals are sent to another transceiver or other suitable recording device for reproduction of the original copy material. For further details concerning the construction and operation of the various components of the copy feed mechanism 18, and of the optical scanner assembly 20 in which the timing belt assembly 36 of the present invention is incorporated, reference may be made to the aforesaid copending application of Frans Brouwer and Frank L. Sobchak.

In the receiving mode of the facsimile transceiver 10, electrical signals received from another transmitter are converted to printing current by suitable circuitry, and this current is used to produce an image of the transmitted copy on electrolytic recording paper. As shown in FIG. 1, the printout mechanism comprises a transverse power driven combined drive and heat roller assembly 112 and an associated pressure roller 114 which together serve to withdraw moist electrolytic recording paper from a roll 116 past a printer bar 118, and issue the paper with reproduced data for viewing.

Arranged for cooperation with the printer bar 118 are the above described printer contact assemblies 94. The printer bar 118 is disposed vertically above and in the straight line path of travel of the scanner and printer contact units 38 along one side of the scanner assembly 20. In the receiving mode, the printer bar 118 is biased downwardly and presses the paper from roll 116 downwardly into contact with the printer contact element 98 of the adjacent printer contact unit 38. As the timing belt assembly 36 is rotated, the printer contact units 38 are moved in the aforementioned closed path and the printer contact elements 98 are successively moved lengthwise of the printer bar 118. Printing current is passed through the associated printer contact elements 98, the recording paper, and the printer bar 118, and iron from the printer bar 118 is deposited on the recording paper and reacts with chemicals therein to produce an image of the transmitted copy. In this manner, copy is reproduced, line-by-line, an elemental area at a time, in synchronism with another transceiver or suitable transmitter in which copy material is being scanned. As the recording paper passes over the combined drive and heat roller assembly 112, it is dried and the electrolytic printing process is completed. Further details of the construction and operation of the various components of the printout mechanism associated with the printer contact assemblies 94 are disclosed in the aforesaid copending application of Frans Brouwer and Frank L. Sobchak.

In the above-described optical scanner assembly 20, the longitudinal flat guide strips 54 and 56 may be replaced, as shown in FIG. 7, with alternative guide means comprised of longitudinal flat hardened steel belt guides 119 engageable with the inboard side of the belt 50 and longitudinal spring members 120 having inwardly bowed edges engageable with the outboard side of the belt 50 for providing a biasing force thereagainst. Further, as shown in FIGS. 8 and 9, a modified embodiment of timing belt assembly 36′ may be employed wherein a pair of endless flexible bands or tapes 122 are engaged or molded in the edges of the elastomeric belt 50′. With the timing belt assembly 36′ in assembled position, the bands 122 are engaged about the flanges 40 and 46 of the drive and idler pulley assemblies 32 and 34 and serve to stabilize the shape of the timing belt assembly 36′. Also, in this modification, upper and lower pairs of tape guides, in the form of longitudinal flat strips 124 and 126, are provided on the opposite sides of the main frame 30 intermediate of the drive and idler pulley assemblies 32 and 34. The tape guides 124 and 126 are carried and biased inwardly by spring loaded support members 128, overlie and engage opposed portions of the outer edges of the tapes 122, and maintain the tapes 122 flat between the guides parallel to the guide faces of the upper and lower wall portions of the frame 30. In addition, the scanner carriage 62 may be secured to the timing belt assembly 36′ by directly threading screws 70′, which extend through the lens holder flanges and the timing belt assembly, into a clamp plate 86′, thereby eliminating the use of the U-shaped securing spring 92. With this arrangement, the combined scanner and printer contact unit 38 is secured to the timing belt assembly 36′ essentially at the two points of the screws 70′ exclusively along a narrow zone extending transversely of the assembly 36′. Thus, this two-point suspension is comparable to the previously described four-point system.

While there has been shown and described preferred embodiments of the present invention, it will be understood by those skilled in the art that various rearrangements and modifications may be made therein without departing from the spirit and scope of the invention.

We claim:

1. For use in an optical scanner assembly, the combination of an endless elastomeric timing belt having interior teeth, an optical scanner carriage at the outer face of said timing belt assembly, an optical scanner secured in said optical scanner carriage projecting through said timing belt assembly and having a flange at the end thereof, a transverse narrow clamp plate at the inner face of said timing belt and having a laterally offset midsection for accommodating said optical scanner, and spring means intermediate said flange of said optical scanner and said clamp plate for holding said clamp plate and said optical scanner carriage together with said timing belt assembly therebetween.